(12) United States Patent
Oi et al.

(10) Patent No.: US 9,660,521 B2
(45) Date of Patent: May 23, 2017

(54) POWER CONVERSION CIRCUIT

(71) Applicant: Toyota Jidosha Kabushiki Kaisha, Toyota-shi Aichi-ken (JP)

(72) Inventors: Shohei Oi, Toyota (JP); Tomoko Oba, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 8 days.

(21) Appl. No.: 14/693,182

(22) Filed: Apr. 22, 2015

(65) Prior Publication Data

US 2015/0311704 A1 Oct. 29, 2015

(30) Foreign Application Priority Data

Apr. 28, 2014 (JP) .................................. 2014-093027

(51) Int. Cl.
| | |
|---|---|
| *H02M 3/00* | (2006.01) |
| *B60L 3/00* | (2006.01) |
| *B60L 11/18* | (2006.01) |
| *B60W 10/00* | (2006.01) |
| *H02M 3/158* | (2006.01) |
| *H02M 1/32* | (2007.01) |

(52) U.S. Cl.
CPC ............. *H02M 3/00* (2013.01); *B60L 3/0023* (2013.01); *B60L 3/0092* (2013.01); *B60L 11/1868* (2013.01); *B60W 10/00* (2013.01); *H02M 3/158* (2013.01); *B60L 2210/10* (2013.01); *B60L 2240/526* (2013.01); *H02M 2001/325* (2013.01); *Y02T 10/7005* (2013.01); *Y02T 10/7066* (2013.01); *Y02T 10/7216* (2013.01)

(58) Field of Classification Search
CPC ........... H02J 1/00; H02M 7/5387; H02M 1/08
USPC ...................................................... 307/80, 71
See application file for complete search history.

(56) References Cited

U.S. PATENT DOCUMENTS

| | | | |
|---|---|---|---|
| 2005/0099364 A1* | 5/2005 | Jung ................... | G09G 3/2965 345/60 |
| 2007/0159749 A1* | 7/2007 | Oka ..................... | H02M 7/487 361/93.1 |

(Continued)

FOREIGN PATENT DOCUMENTS

| | | |
|---|---|---|
| CN | 102237672 A | 11/2011 |
| CN | 103141019 A | 6/2013 |
| JP | 2012-070514 A | 4/2012 |

*Primary Examiner* — Rexford Barnie
*Assistant Examiner* — Daniel Kessie
(74) *Attorney, Agent, or Firm* — Dinsmore & Shohl LLP (57) ABSTRACT

A power conversion circuit includes first to fourth switching elements connected in series between ground and high voltage electrical paths, a first reactor, a main battery, a second reactor, a sub battery, a high voltage sensor for detecting a high voltage VH between the ground and high voltage electrical paths, and a controller. Upon issuance of an instruction for turning off all of the first to fourth switching elements, the controller determines that the third switching element is experiencing an ON failure when the high voltage VH is equal to the sum of a battery voltage $VB_1$ of the main battery and a battery voltage $VB_2$ of the sub battery, to thereby allow electrical power to be transferred between the batteries and a load even in the event of occurrence of the ON failure in the switching element.

4 Claims, 7 Drawing Sheets (56) References Cited

U.S. PATENT DOCUMENTS

| | | | |
|---|---|---|---|
| 2008/0238383 A1* | 10/2008 | Watanabe | H02M 1/32 323/271 |
| 2009/0295321 A1* | 12/2009 | Okamoto | H02H 7/0844 318/490 |
| 2010/0214055 A1* | 8/2010 | Fuji | B60L 3/00 340/3.1 |
| 2011/0278918 A1* | 11/2011 | Shindo | B60L 3/0007 307/9.1 |
| 2013/0134786 A1 | 5/2013 | Ishigaki et al. | |
| 2013/0342151 A1* | 12/2013 | Kurokawa | H02M 7/537 318/500 |
| 2014/0265605 A1* | 9/2014 | Ishigaki | H02M 3/158 307/80 |
| 2015/0084422 A1* | 3/2015 | Ishigaki | H01F 27/38 307/43 |
| 2015/0333637 A1* | 11/2015 | Izumi | H02M 1/32 363/21.01 |

* cited by examiner

POWER CONVERSION CIRCUIT

The present application claims priority to Japanese Patent Application No. 2014-093027 filed on Apr. 28, 2014, which is incorporated herein by reference in its entirety.

TECHNICAL FIELD

The present invention relates to a configuration of a power conversion circuit.

BACKGROUND ART

In electrically driven vehicles such as hybrid vehicles or electric vehicles, a step-up/down convertor (power conversion apparatus) is used in which a voltage of a battery is stepped up to supply the stepped-up voltage to a motor generator while a voltage of electrical power generated in the motor generator is stepped down to charge the battery with the stepped-down electrical power.

In recent years, power conversion apparatuses have come into use, in which a combination of two batteries and four switching elements is incorporated to step up and down the two batteries connected in series or to step up and down the batteries connected in parallel (refer to, for example, JP 2012-70514 A).

SUMMARY

Technical Problems

For transmission of electrical power between parallel connected two batteries and a motor generator (a load) in a power conversion circuit as described in JP 2012-70514, the power conversion circuit uses an operation mode for outputting electrical power of the batteries to the motor generator with three of four switching elements turned on and one of the four switching elements turned off. In this mode, when the one switching element to be turned off is in a failure condition where the one switching element is turned on (an ON failure), the switching elements are all turned on at the same time, which results in detection of an abnormal condition. Upon the detection of such an abnormal condition, a circuit protective function is activated for allowing a controller to issue an instruction for turning off all of the switching elements in the power conversion circuit, to thereby disable the power conversion circuit. As a result of this, it becomes impossible to supply electrical power to the load.

The present invention advantageously provides a power conversion circuit capable of transmitting electrical power between a battery and a load even when an ON failure of a switching element occurs in the power conversion circuit.

Solution to the Problems

According to an aspect of the present invention, a power conversion circuit comprises a ground electrical path and a high voltage electrical path that output electrical power to a load, first, second, third, and fourth switching elements serially connected in that order from the high voltage electrical path toward the ground electrical circuit, first, second, third, and fourth diodes respectively connected in anti-parallel to the switching elements, a first electrical path that connects a second junction point between the second and third switching elements to the ground electrical path, a first reactor and a first direct current power supply connected in series on the first electrical path, a second electrical path that connects a first junction point between the first and second switching elements to a third junction point between the third and fourth switching elements, a second reactor and a second direct current power supply connected in series on the second electrical path, a voltage sensor that detects a voltage between the ground electrical path and the high voltage electrical path, and a controller that turns on and off each of the switching elements. In the power conversion circuit, the controller comprises a failure determination means that determines, when the voltage between the ground electrical path and the high voltage electrical path detected by the voltage sensor becomes equal to a sum of voltages of the first and second direct current power supplies after issuing an instruction for turning off all of the first to fourth switching elements, that the third switching element is experiencing an ON failure.

According to another aspect of the present invention, the power conversion circuit comprises ground and high voltage electrical paths that output electrical power to a load, first, second, third, and fourth switching elements serially connected in that order from the high voltage electrical path toward the ground electrical path, first, second, third, and fourth diodes respectively connected in anti-parallel to the switching elements, a first electrical path that connects a second junction point between the second and third switching elements to the ground electrical path, a first reactor and a first direct current power supply connected in series on the first electrical path, a second electrical path that connects a first junction point between the first and second switching elements to a third junction point between the third and fourth switching elements, a second reactor and a second direct current power supply connected in series on the second electrical path, and a controller that turns on and off each of the switching elements. In the power conversion circuit, the controller comprises an evacuation mode operation means that turns on the first switching element and turns off the second and fourth switching elements when the third switching element is experiencing a failure.

A control method according to a further aspect of the present invention is a method for controlling a power conversion circuit comprising ground and high voltage electrical paths that output electrical power to a load, first, second, third, and fourth switching elements serially connected in that order from the high voltage electrical path toward the ground electrical path, first, second, third, and fourth diodes respectively connected in anti-parallel to the switching elements, a first electrical path that connects a second junction point between the second and third switching elements to the ground electrical path, a first reactor and a first direct current power supply connected in series on the first electrical path, a second electrical path that connects a first junction point between the first and second switching elements to a third junction point between the third and fourth switching elements, a second reactor and a second direct current power supply connected in series on the second electrical path, and a voltage sensor that detects a voltage between the ground and high voltage electrical paths. The method comprises determining, when the voltage between the ground and high voltage electrical paths detected by the voltage sensor becomes equal to the sum of voltages of the first and second direct current power supplies upon issuance of an instruction for turning off all of the first to fourth switching elements, that the third switching element is experiencing an ON failure.

A control method according to another aspect of the invention is a method for controlling a power conversion circuit comprising ground and high voltage electrical paths that output electrical power to a load, first, second, third, and fourth switching elements serially connected in that order from the high voltage electrical path toward the ground electrical path, first, second, third, and fourth diodes respectively connected in anti-parallel to the switching elements, a first electrical path that connects a second junction point between the second and third switching elements to the ground electrical path, a first reactor and a first direct current power supply connected in series on the first electrical path, a second electrical path that connects a first junction point between the first and second switching elements to a third junction point between the third and fourth switching elements, and a second reactor and a second direct current power supply connected in series on the second electrical path. The method comprises turning on the first switching element and turning off the second and fourth switching elements when the third switching element is experiencing a failure.

The present invention advantageously provides an effect that electrical power can be transmitted between a battery and a load in the power conversion circuit even when the ON failure of the switching element occurs.

BRIEF DESCRIPTION OF THE DRAWINGS

A preferred embodiment of the present invention will be described in detail based on the following figures, wherein.

DESCRIPTION OF THE EMBODIMENT

Figure 1:
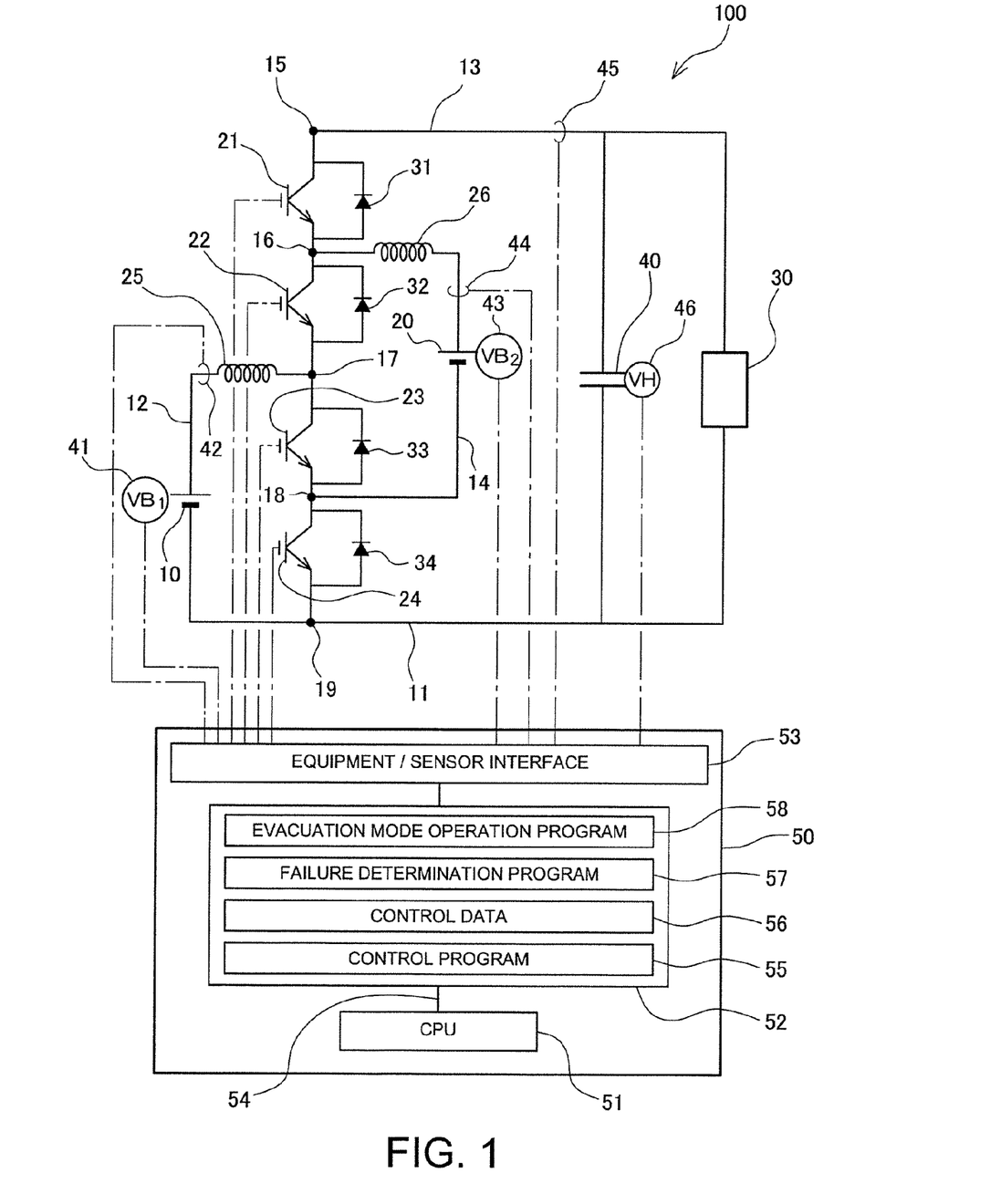
FIG. 1 is a schematic diagram showing a configuration of a power conversion circuit according to an embodiment of the present invention.

Referring now to the drawings, an embodiment of the present invention will be described below. As shown in FIG. 1, a power conversion circuit 100 in this embodiment includes a ground electrical path 11 and a high voltage electrical path 13 that output electrical power to a load 30; first, second, third, and fourth switching elements 21, 22, 23, and 24 connected in series between a high voltage junction point 15 in the high voltage electrical path 13 and a ground junction point 19 in the ground electrical path 11; a first electrical path 12 that connects a second junction point 17 between the second and third switching elements 22 and 23 to the ground electrical path 11; and a second electrical path 14 that connects a first junction point 16 between the first and second switching elements 21 and 22 to a third junction point 18 between the third and fourth switching elements 23 and 24. Each of the switching elements 21-24 is a power semiconductor switching element such as an IGBT (Insulated Gate Bipolar Transistor), a power MOS (Metal Oxide Semiconductor) transistor, or a power bipolar transistor. The load 30 is a component, such as, for example, a motor generator for an electric vehicle, that outputs power and performs regeneration of electrical power.

A smoothing capacitor 40 is connected between the ground electrical path 11 and the high voltage electrical path 13, and first, second, third, and fourth diodes 31, 32, 33, and 34 are respectively connected in anti-parallel to the switching elements 21, 22, 23, and 24. In the first electrical path 12, a first reactor 25 and a main battery 10, which is a first direct current power supply, are connected in series, while in the second electrical path 14, a second reactor 26 and a sub battery 20, which is a second direct current power supply, are connected in series. Each of the main battery 10 and the sub battery 20 may be, for example, a secondary battery such as a lithium ion secondary battery or a nickel hydrogen battery.

The smoothing capacitor 40 is attached to a high voltage sensor 46 for detecting a high voltage VH between the ground electrical path 11 and the high voltage electrical path 13. Further, each battery 10, 20 is attached to a battery voltage sensor 41, 43 that detects a battery voltage ($VB_1$, $VB_2$) of the battery 10, 20. The high voltage electrical path 13, the first electrical path 12, and the second electrical path 14 are respectively attached to current sensors 45, 42, and 44 that detect currents passing through the electrical paths 13, 12, 14, respectively.

As shown in FIG. 1, a controller 50 includes a CPU 51 for performing arithmetic processing, a memory 52, and an equipment/sensor interface 53. The CPU 51 for performing arithmetic processing, the memory 52, and the equipment/sensor interface 53 are connected through a data bus 54 to constitute a computer. The memory 52 internally stores a control program 55 for the power conversion circuit 100, control data 56, a failure determination program 57, which is a failure determination means described below, and an evacuation mode operation program 58, which is an evacuation mode operation means. It should be noted that the above-described switching elements 21 to 24 in the power conversion circuit 100 are connected to the controller 50 through the equipment/sensor interface 53 and configured to be operated by an instruction from the controller 50. Further, each output of the voltage sensors 41, 43, 46 and the current sensors 42, 44, 45 is input through the equipment/sensor interface 53 into the controller 50.

Figure 2A:
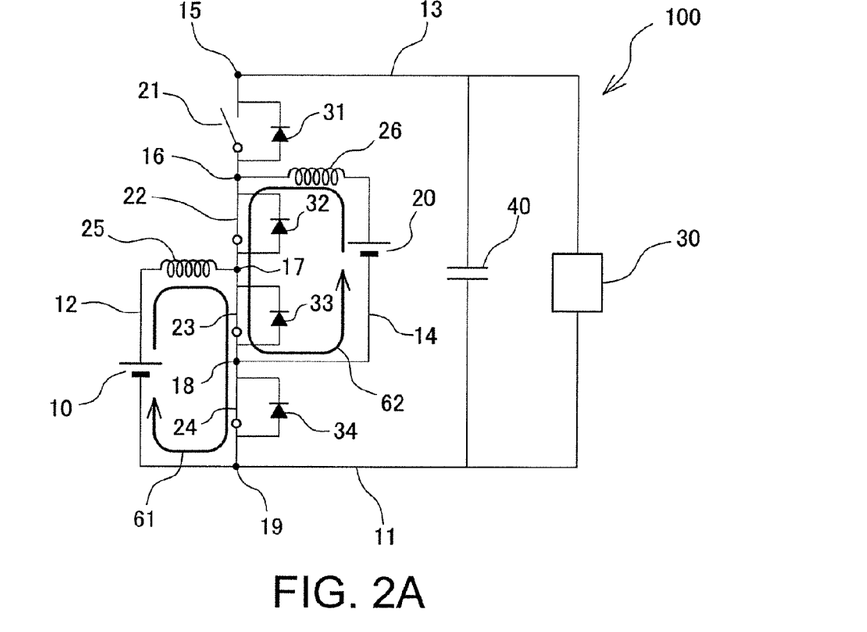
FIG. 2A is an illustrative diagram showing operation in a parallel connection mode of a power conversion apparatus according to this invention.
Figure 2B:
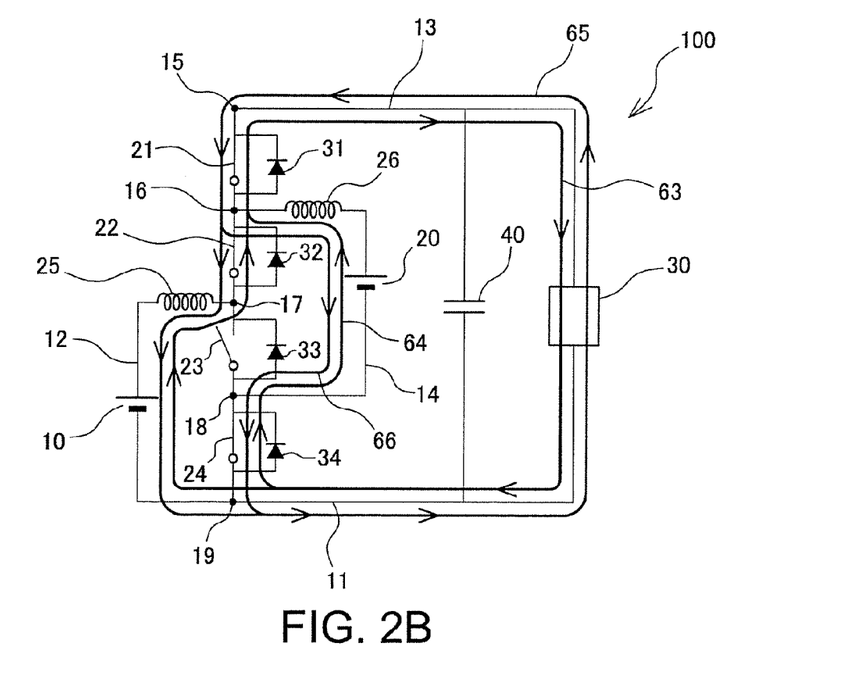
FIG. 2B is an illustrative diagram showing operation in the parallel connection mode of the power conversion apparatus according to this invention.
Figure 3A:
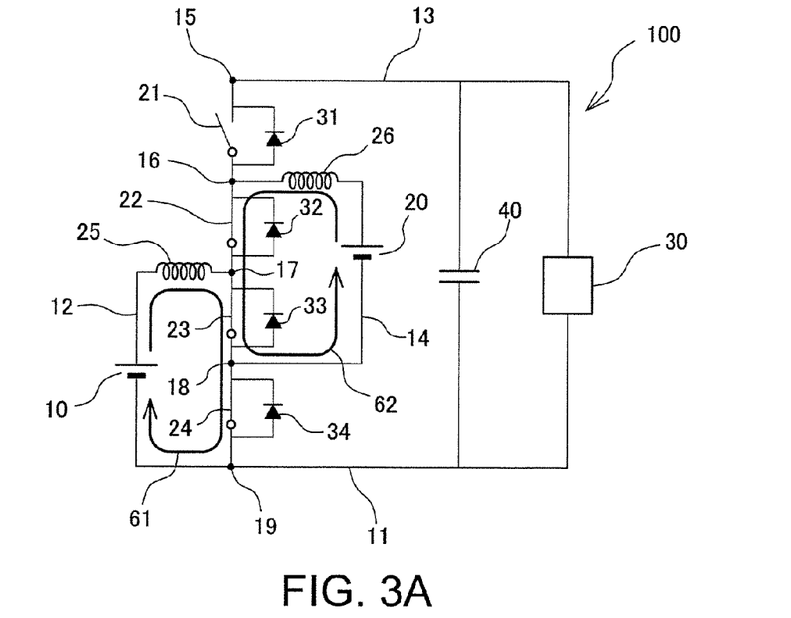
FIG. 3A is an illustrative diagram showing operation in a series connection mode of the power conversion apparatus according to this invention.
Figure 3B:
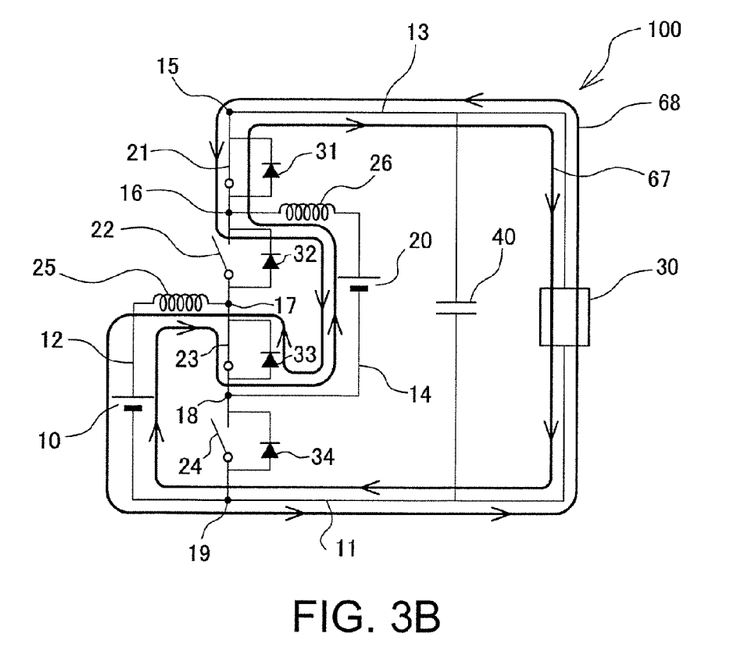
FIG. 3B is an illustrative diagram showing operation in the series connection mode of the power conversion apparatus according to this invention.

Referring next to FIGS. 2A, 2B, 3A and 3B, normal operation of the power conversion circuit 100 in this embodiment will be described. FIG. 2A, 2B shows operation in a parallel connection mode in which the main battery 10 and the sub battery 20 are connected in parallel to transmit electrical power between the load and the main and sub batteries 10, 20. FIG. 3A, 3B shows operation in a series connection mode in which the main battery 10 and the sub battery 20 are connected in series to transmit electrical power between the load and the main and sub batteries 10, 20. It should be noted that, in FIGS. 2A, 2B, 3A, 3B and 5A to 7, each of the switching elements 21 to 24 is schematically depicted as a simple ON/OFF switch. It is also noted that the same components as those in FIG. 1 are designated by the same reference numerals as those of FIG. 1, and the descriptions related to the components will not be repeated.

In operation of the parallel connection mode, the controller 50 causes two circuits 61 and 62 to be established as shown in FIG. 2A by turning off the first switching element 21 while turning on the second to fourth switching elements 22 to 24, to thereby store electrical power of the main battery 10 in the first reactor 25 and store electrical power of the sub battery 20 in the second reactor 26. Then, as shown in FIG. 2B, the controller 50 turns on the first, second, and fourth switching elements 21, 22, and 24 and turns off the third switching element 23. This allows, as shown in FIG. 2B, the electrical power stored in the first reactor 25 to be output to the load 30 as a current flowing through a circuit 63 which is formed from the first reactor 25 passing through the second and first diodes 32 and 31, the high voltage electrical path 13, the load 30, the ground electrical path 11, the first electrical path 12, and the main battery 10 and back to the first reactor 25. Further, as shown in FIG. 2B, the electrical power stored in the second reactor 26 is output to the load 30 as a current flowing through a circuit 64 which is formed from the second reactor 26, the first diode 31, the high voltage electrical path 13, the load 30, the ground electrical path 11, the fourth diode 34, the second electrical path 14, and the sub battery 20 and back to the second reactor 26. The controller 50 alternately changes between the modes shown in FIGS. 2A and 2B to step up the voltages of the main battery 10 and the sub battery 20 and supply the stepped-up voltages to the load 30.

On the other hand, regenerative power from the load 30 is charged, as shown in FIG. 2B, to the main battery 10 through a circuit 65 which is formed from the load 30 passing through the high voltage electrical path 13, the first switching element 21, the second switching element 22, the first electrical path 12, the first reactor 25, the main battery 10, and the ground electrical path 11 and back to the load 30, and also charged to the sub battery 20 through a circuit 66 which is formed from the load 30 passing through the high voltage electrical path 13, the first switching element 21, the second electrical path 14, the second reactor 26, the sub battery 20, the fourth switching element 24, and the ground electrical path 11 and back to the load 30.

In operation of the series connection mode as shown in FIG. 3A, the controller 50 causes the two circuits 61 and 62 to be established similarly with the operation of the parallel connection mode by turning off the first switching element 21 while turning on the second to fourth switching elements 22 to 24, to thereby store electrical power of the main battery 10 in the first reactor 25 and also store electrical power of the sub battery 20 in the second reactor 26. Then, as shown in FIG. 3B, the controller 50 turns on the first and third switching elements 21 and 23, and turns off the second and fourth switching elements 22 and 24. This allows the electrical power stored in the second reactor 26 to be output to the load 30 as a current flowing through a circuit 67 which is formed from the first reactor 25 passing through the third switching element 23, the second electrical path 14, the sub battery 20, the second reactor 26, the first diode 31, the high voltage electrical path 13, the load 30, the ground electrical path 11, the first electrical path 12, and the main battery 10 and back to the first reactor 25 as shown in FIG. 3B. The controller 50 alternately changes between the modes shown in FIG. 3A and FIG. 3B to step up the voltage across the parallel connected main battery 10 and sub battery 20 and supply the stepped up voltage to the load 30.

On the other hand, the regenerative power from the load 30 is charged, as shown in FIG. 3B, to the main and sub batteries 10 and 20 through a circuit 68 which is formed from the load 30 passing through the high voltage electrical path 13, the first switching element 21, the second electrical path 14, the second reactor 26, the sub battery 20, the third diode 33, the first electrical path 12, the first reactor 25, the main battery 10, and the ground electrical path 11 and back to the load 30. Referring next to FIGS. 4 to 7, operation of the power conversion circuit 100 according to the embodiment of this invention will be described below. The controller 50 operates in the parallel connection mode as shown in steps 101 and 102 of FIG. 4 in which an action of turning off the first switching element 21 while turning on the second to fourth switching elements 22 to 24 and an action of turning on the first, second, and fourth switching elements 21, 22 and 24 while turning off the third switching element 23 are alternately repeated as described above with reference to FIGS. 2A and 2B.

Figure 4:
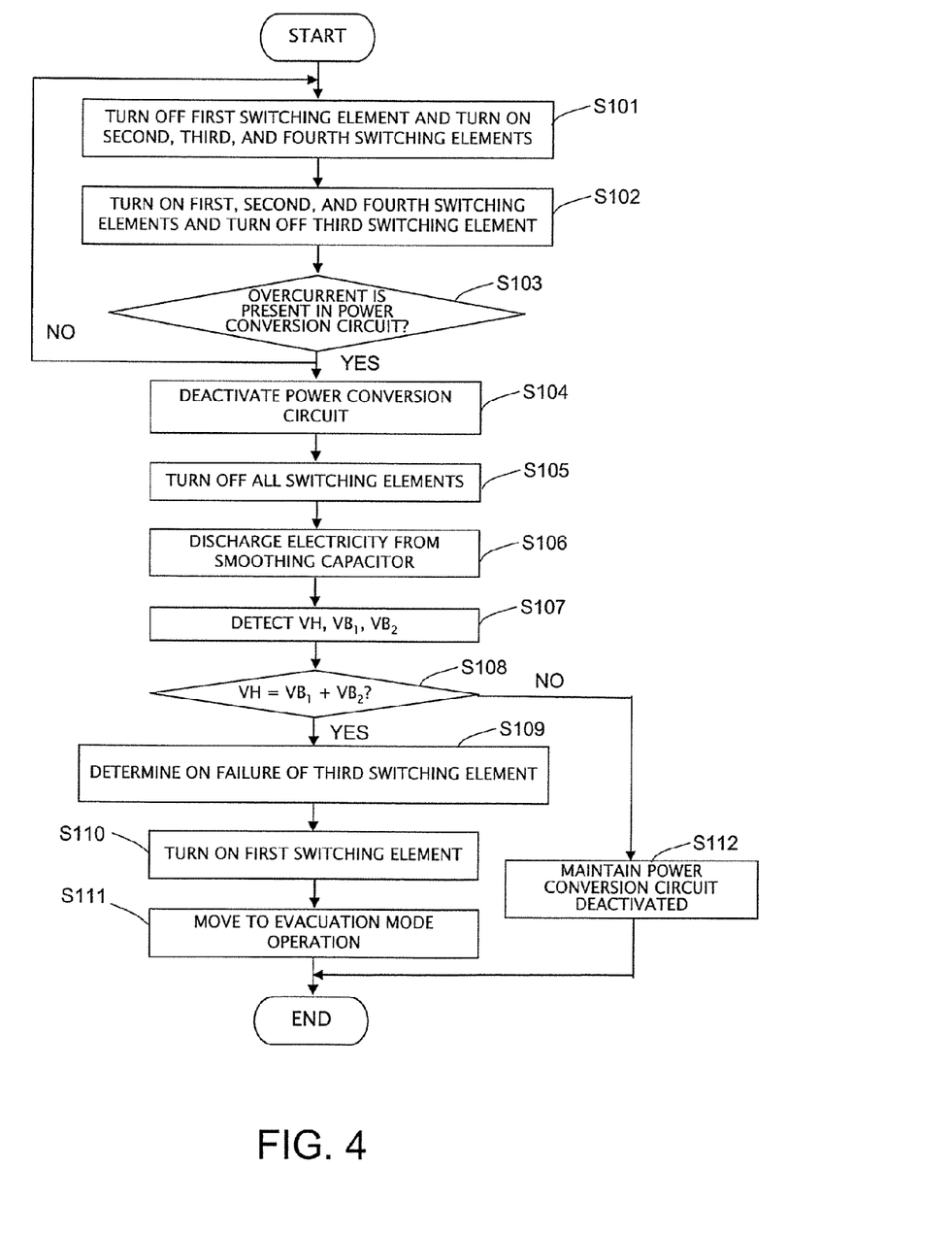
FIG. 4 is a flow chart showing operation of the power conversion apparatus according to this invention.

As shown in step 103 in FIG. 4, the controller 50 obtains a current flowing through a current sensor 45 attached to the high voltage electrical path 13 shown in FIG. 1 in order to monitor the power conversion circuit 100 for finding the presence of an over current therein. When the controller 50 finds that no over current is present in the power conversion circuit 100 in step 103 in FIG. 4, operation returns to step 101, and the controller 50 continues its operation in the parallel connection mode.

Figure 5A:
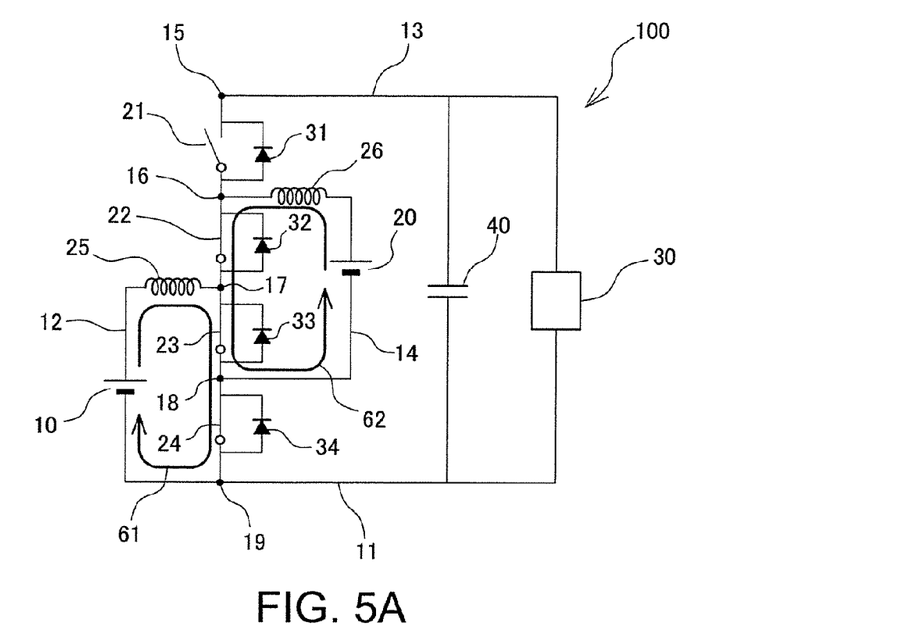
FIG. 5A is an illustrative diagram showing a flow of currents in a condition where a third switching element suffers an ON failure in the power conversion apparatus according to this invention.
Figure 5B:
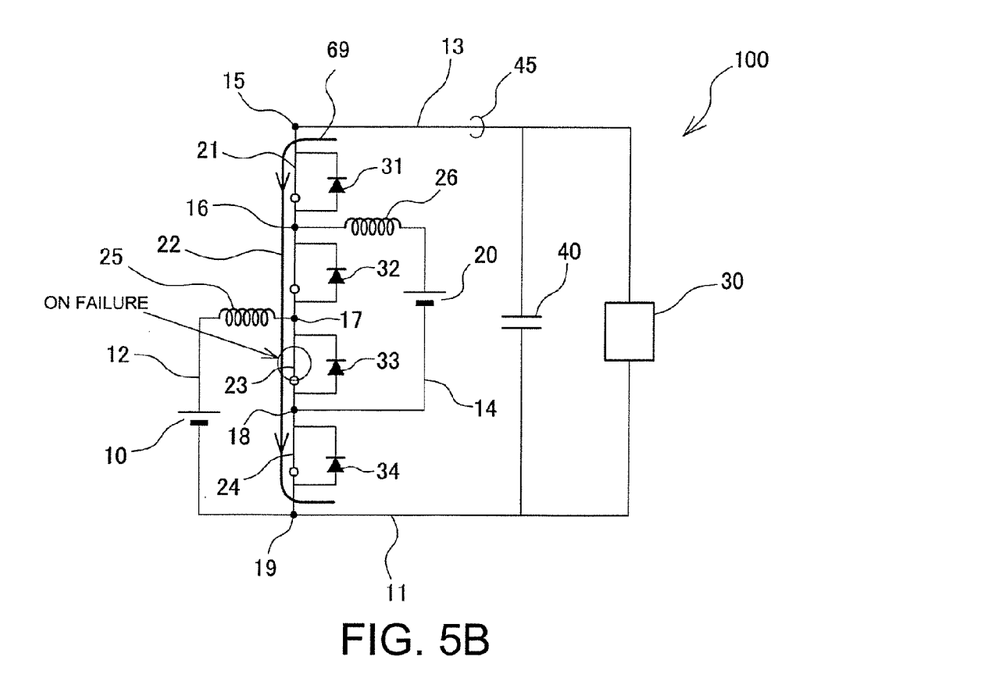
FIG. 5B is an illustrative diagram showing a flow of currents in a condition where the third switching element suffers the ON failure in the power conversion apparatus according to this invention.

Now, operation performed when the third switching element 23 is experiencing the ON failure will be described. Also in this case, the controller 50 turns off the first switching element 21 while turning on the second to fourth switching elements 22 to 24 as shown in step 101 in FIG. 4 and depicted in FIG. 5A. Because the third switching element 23 is controlled to be turned on, any problematic action is caused by the ON failure of the third switching element 23. Then, the controller 50 outputs, in the next step 102 in FIG. 4, an instruction to turn on the first, second, and fourth switching elements 21, 22, and 24 and turn off the third switching element 23, which results in a situation, when the third switching element 23 suffers the ON failure, where all of the first to fourth switching elements 21 to 24 are in an on state as shown in FIG. 5B. This establishes a short circuit 69 between the high voltage electrical path 13 and the ground electrical path 11, allowing a passage of a large current from the high voltage electrical path 13 to the ground electrical path 11 as indicated by an arrow in FIG. 5B. The controller 50 determines that the over current is present in the power conversion circuit 100 when a current value obtained from the current sensor 45 in the high voltage electrical path 13 in step 103 in FIG. 4 exceeds a predetermined threshold value, and accordingly deactivates the power conversion circuit 100 as shown in step 104 in FIG. 4.

As shown in step 105 in FIG. 4, the controller 50 issues an instruction to turn off all of the first to fourth switching elements 21 to 24. Next, the controller 50 issues an instruction to discharge electricity from the smoothing capacitor 40 as shown in step 106 in FIG. 4. When the third switching element 23 is not experiencing the ON failure, the main and sub batteries 10 and 220 are completely interrupted from the smoothing capacitor 40 by the instruction, and the voltage of the high voltage electrical path 13 is accordingly reduced to zero.

Figure 6:
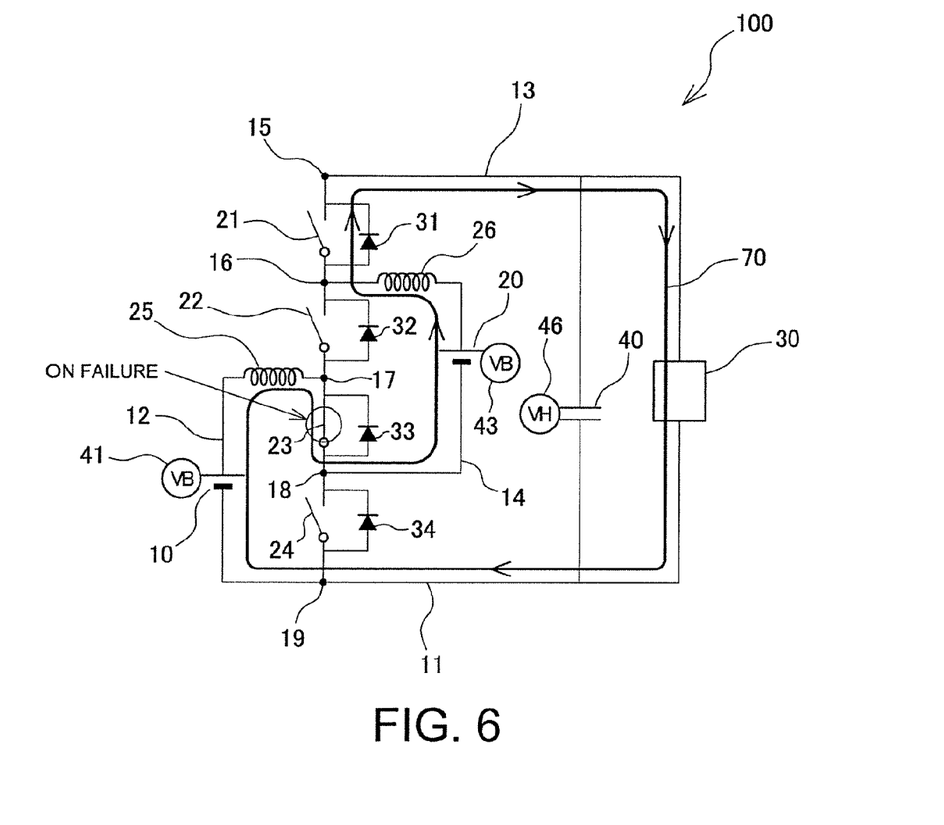
FIG. 6 is an illustrative diagram showing a flow of currents in a condition where the third switching element suffers the ON failure in the power conversion apparatus according to this invention.
Figure 7:
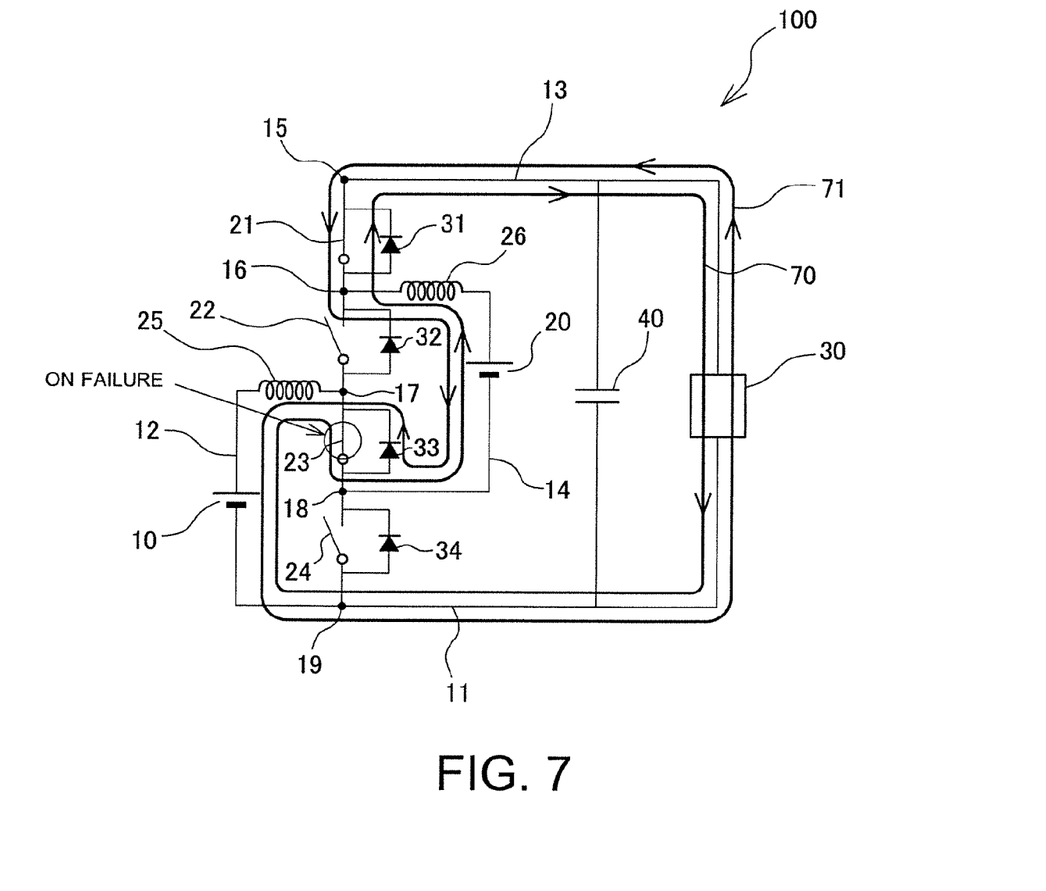
FIG. 7 is an illustrative diagram showing operation in an evacuation mode performed when the third switching element suffers the ON failure in the power conversion apparatus according to this invention.

On the other hand, when the third switching element 23 is experiencing the ON failure, the main battery 10 is connected to the sub battery 20 through a circuit 70 formed from the main battery 10 passing through the first electrical path 12, the first reactor 25, the third switching element 23, the second electrical path 14, the sub battery 20, the second reactor 26, the diode 31, the high voltage electrical path 13, the load 30, and the ground electrical path 11 and back to the main battery 10 as shown in FIG. 6. In such a connected state, a high voltage VH detected by the high voltage sensor 46 attached to the smoothing capacitor 40 becomes equal to the sum of a battery voltage $VB_1$ of the main battery 10 detected by the battery voltage sensor 41 and a battery voltage $VB_2$ of the sub battery 20 detected by the battery voltage sensor 43. In other words, the following equation, $VH=VB_1+VB_2$, is satisfied.

Then, the controller 50 executes the failure determination program 57 shown in FIG. 1 to detect the high voltage VH and the battery voltages $VB_1$ and $VB_2$ by means of the voltage sensors 41, 43, and 46, respectively after instructing the smoothing capacitor 40 to discharge electricity as shown in step 107 in FIG. 4, and determine whether $VH=VB_1+VB_2$ as shown in step 108 in FIG. 4. When the high voltage VH is equal to the summed voltage $(VB_1+VB_2)$, the controller 50 determines that the third switching element 23 is experiencing the ON failure as shown in step 109 in FIG. 4.

Even in this state, it is possible to supply electrical power to the load 30 through the circuit 70 with the main battery 10 and the sub battery 20 connected in series as shown in FIG. 6, which allows a motor generator, which is the load 30, of an electric vehicle to be driven for evacuation travel until residual capacities (SOC) of the main battery 10 and the sub battery 20 reach zero. During the travel, however, currents are not allowed to flow through the circuit 70 along a reverse direction due to the diode 31, which prevents each battery 10, 20 from being charged with regenerative power from the motor generator of the electric vehicle; i.e., the load 30. This is problematic in that a sufficient evacuation travel distance cannot be secured.

To avoid such a problematic situation, the controller 50 executes the evacuation mode operation program 58 shown in FIG. 1, and after the ON failure of the third switching element 23 is determined in step 109 in FIG. 4, turns on the first switching element 21 as shown in step 110 in FIG. 4 for shifting to evacuation mode operation as shown in step 111 in FIG. 4. As a result, a circuit 71 is established in which a current can flow through the first switching element 21 and the third diode 33 along a direction opposite to that of the circuit 70. In this way, the electrical power generated in the load 30 is charged through the circuit 71 to each battery 10, 20. Thus, in the power conversion circuit 100 of this embodiment, even when the ON failure occurs in the third switching element 23, it is possible to supply electrical power to the load 30 in addition to charging each battery 10, 20 with regenerative power of the load 30. In other words, because electrical power can be transferred between each battery 10, 20 and the load 30 to extend the evacuation travel distance while keeping a regenerative brake usable, more preferable evacuation travel can be realized even in the event of a failure occurring in the power conversion circuit 100.

It should be noted that in a case where it is found in step 108 in FIG. 4 that the high voltage VH does not match the sum $(VB_1+VB_2)$, the controller 50 determines that a switching element other than the switching element 23 is experiencing the ON failure, and maintains a halt state of the power conversion circuit 100 as shown in step 112 in FIG. 4.

Although the embodiment of this invention has been described above, the present invention is not limited to the specific embodiment. It is to be understood that various changes and modifications that are made without departing from the technical scope or essence of the present invention defined in the appended claims are therefore intended to be embraced by the claims. For example, the main battery 10 and the sub battery 20, which are described as being secondary batteries such as a lithium ion secondary battery or a nickel hydrogen battery in the embodiment described with reference to FIGS. 1 to 7, may be an electrical double layer capacitor, a lithium ion capacitor, or the like.

The invention claimed is:

1. A power conversion circuit comprising:
    a ground electrical path and a high voltage electrical path that output electrical power to a load;
    first, second, third, and fourth switching elements that are serially connected in that order from the high voltage electrical path toward the ground electrical path;
    first, second, third, and fourth diodes that are respectively connected in anti-parallel to the switching elements;
    a first electrical path that connects a second junction point between the second and third switching elements to the ground electrical path;
    a first reactor and a first direct current power supply connected in series on the first electrical path;
    a second electrical path that connects a first junction point between the first and second switching elements to a third junction point between the third and fourth switching elements;
    a second reactor and a second direct current power supply connected in series on the second electrical path;
    a voltage sensor that detects a voltage between the ground and high voltage electrical paths, and
    a controller that includes a CPU to turn on and off each of the switching elements, wherein;
    the controller causes the CPU to perform, upon issuance of an instruction for turning off all of the first to fourth switching elements, a failure determination program for determining that the third switching element is experiencing an ON failure when the voltage between the ground and high voltage electrical paths detected by the voltage sensor is equal to the sum of voltages of the first and second direct current power sources.

2. The power conversion circuit according to claim 1, wherein;
    the controller causes, when the third switching element is experiencing an ON failure, the CPU to perform an evacuation mode operation program for turning on the first switching element while turning off the second and fourth switching elements.

3. A method for controlling a power conversion circuit, the circuit comprising:
    a ground electrical path and a high voltage electrical path that output electrical power to a load;
    first, second, third, and fourth switching elements that are serially connected in that order from the high voltage electrical path toward the ground voltage path;
    first, second, third, and fourth diodes that are respectively connected in anti-parallel to the switching elements;

a first electrical path that connects a second junction point between the second and third switching elements to the ground electrical path;

a first reactor and a first direct current power supply connected in series on the first electrical path;

a second electrical path that connects a first junction point between the first and second switching elements to a third junction point between the third and fourth switching elements;

a second reactor and a second direct current power supply connected in series on the second electrical path, and a voltage sensor that detects a voltage between the ground and high voltage electrical paths, wherein the method comprises;

when it is found, upon issuance of an instruction for turning off all of the first to fourth switching elements, that the voltage between the ground and high voltage electrical paths detected by the voltage sensor is equal to the sum of voltages of the first and second direct current power supplies, determining that the third switching element is experiencing an ON failure.

4. The method according to claim 3, wherein the method comprises;

when the third switching element is experiencing an ON failure, turning on the first switching element, and turning off the second and fourth switching elements.

* * * * *